United States Patent
Zhou (10) Patent No.: US 10,250,904 B2
(45) Date of Patent: Apr. 2, 2019

(54) APPARATUS AND METHOD FOR OVERLAPPED MOTION COMPENSATION FOR VIDEO CODING

(71) Applicant: Avago Technologies International Sales Pte. Limited, Singapore (SG)

(72) Inventor: Minhua Zhou, San Diego, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 86 days.

(21) Appl. No.: 15/146,553

(22) Filed: May 4, 2016

(65) Prior Publication Data

US 2016/0330475 A1 Nov. 10, 2016

Related U.S. Application Data

(60) Provisional application No. 62/157,393, filed on May 5, 2015.

(51) Int. Cl.
*H04N 19/59* (2014.01)
*H04N 19/583* (2014.01)

(52) U.S. Cl.
CPC ................ *H04N 19/583* (2014.11)

(58) Field of Classification Search
CPC .................................................. H04N 19/583
USPC ..................................................... 375/240.16
See application file for complete search history.

(56) References Cited

U.S. PATENT DOCUMENTS 9,807,424 B2 * 10/2017 Guo .................... H04N 19/159
9,883,203 B2 * 1/2018 Chien .................. H04N 19/105
2013/0128974 A1 * 5/2013 Chien .................. H04N 19/105
  375/240.15
2014/0072041 A1 * 3/2014 Seregin ............... H04N 19/105
  375/240.13
2014/0105299 A1 * 4/2014 Chen ................... H04N 19/597
  375/240.15
2014/0161189 A1 * 6/2014 Zhang ................. H04N 19/597
  375/240.16
2014/0286416 A1 * 9/2014 Jeon .................... H04N 19/593
  375/240.12
2015/0098503 A1 * 4/2015 Pu ......................... H04N 19/50
  375/240.12

(Continued)

OTHER PUBLICATIONS

Smei et al, Pipelining the HEVC decoder an ZedBoard Platform (Year: 2016).*

(Continued)

*Primary Examiner* — Shan E Elahi
(74) *Attorney, Agent, or Firm* — Sterne, Kessler, Goldstein & Fox P.L.L.C.

(57) ABSTRACT

A method and apparatus for overlapped block motion compensation (OBMC) for video coding are provided. A current prediction block and a plurality of adjacent prediction blocks including an above prediction block, a below prediction block, a left prediction block, and a right prediction block are received and blended to generate a blended prediction block. Weighted samples of the current prediction block are combined with corresponding weighted samples of the above and below prediction blocks to generate an intermediate prediction block. Weighted samples of the intermediate prediction block are combined with corresponding weighted samples of the left and right prediction blocks to generate the blended prediction block.

20 Claims, 10 Drawing Sheets

(56) References Cited

U.S. PATENT DOCUMENTS

2015/0163509 A1* 6/2015 Hsu ................... H04N 19/583
                                                        375/240.16
2016/0191931 A1* 6/2016 Hannuksela ......... H04N 19/105
                                                        375/240.12

OTHER PUBLICATIONS

Sze et al, A compression of CABAC throughput for HEVC/H.265 VS. AVC/H.264 (Year: 2013).*

* cited by examiner

APPARATUS AND METHOD FOR OVERLAPPED MOTION COMPENSATION FOR VIDEO CODING

CROSS-REFERENCE TO RELATED APPLICATIONS

This application claims benefit of U.S. Provisional Application No. 62/157,393, filed May 5, 2015, which is incorporated herein by reference in its entirety.

TECHNICAL FIELD

The present disclosure relates generally to video motion compensation.

BACKGROUND

The HEVC (High Efficient Video Coding) is a new video compression standard developed by the joint collaborative team (JCT) jointly established by ISO/IEO MPEG and ITU-T. Version 1 of the HEVC standard for single layer coding was finalized in January 2013, and officially approved by the parent body MPEG as MPEG-H and ITU-T as H.265. HEVC has a design goal of being at least 50% more efficient than the previous standard MPEG AVC/ITU-T H.264.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
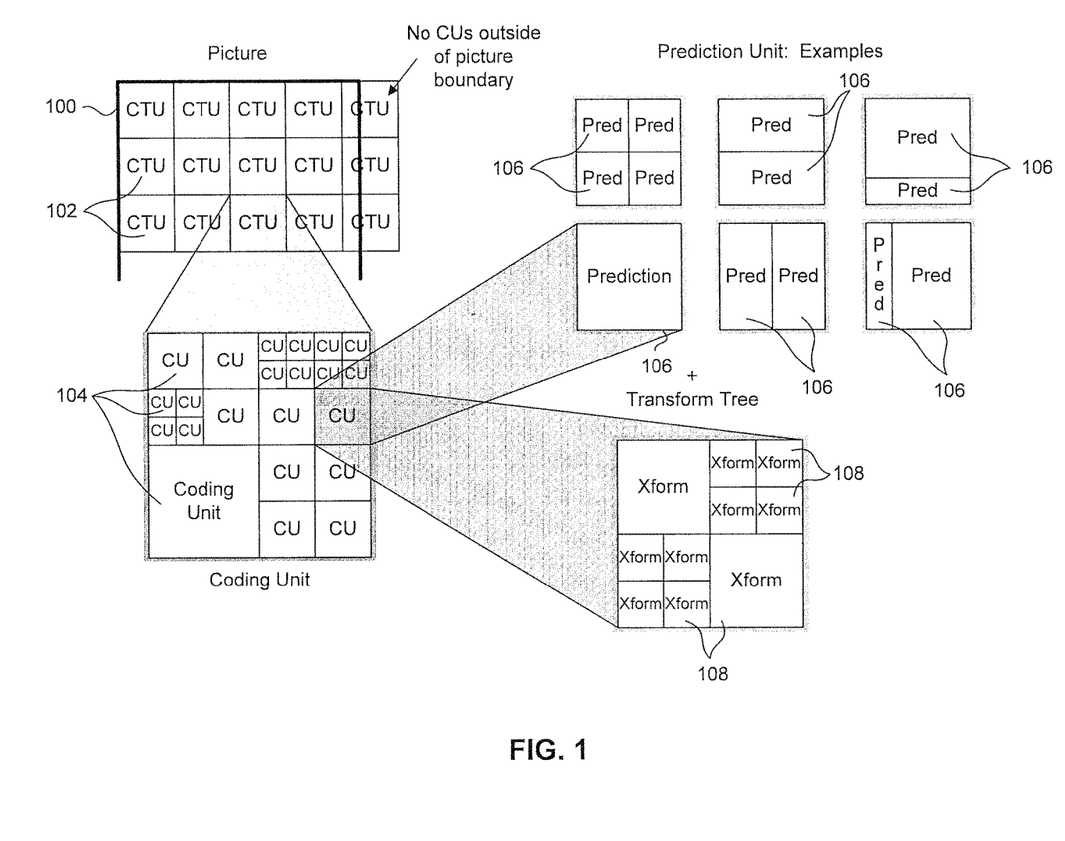
FIG. 1 illustrates a block structure according to the High Efficiency Video Coding (HEVC) video compression standard.

To achieve better coding efficiency, HEVC employs a flexible block coding structure. FIG. 1 illustrates a block structure according to HEVC. As shown in FIG. 1, in HEVC, a picture 100 is divided into a plurality of coding tree units (CTUs) 102. A CTU 102 can be up to 64×64 pixels in size, and can be decomposed into variable size coding units (CUs) 104. CUs 104 may be as small as 8×8 pixels or as large as 64×64 pixels.

As further described below, in HEVC, a CU 104 may be intra-coded (encoded with prediction from neighboring reference samples of the same picture) or inter-coded (encoded with prediction from reference samples from other pictures). Intra-coding uses intra-prediction to generate a prediction of a block (prediction block) based on reference samples of neighboring blocks of the same picture. Inter-coding uses inter-prediction to generate a prediction block based on reference samples of blocks of previous or future pictures. Intra-prediction and inter-prediction are performed by dividing a CU 104 into one or more prediction units (PUs) 106 and applying intra- or inter-prediction on the PUs 106. As shown in FIG. 1, a CU 104 may be divided into one or more PUs 106 in various ways. Intra-prediction and inter-prediction may also be applied on sub-blocks of a PU. As used herein, the term prediction block is used to refer to a group of pixels resulting from intra- or inter-prediction performed on a corresponding group of pixels. The corresponding group of pixels may be a sub-block of a PU, a PU, or even a CU.

Another HEVC process, further described below, includes applying a transform to a prediction residual block. A prediction residual blocks results from subtracting a prediction block from an original block. For the purpose of applying this transformation, a CU 104 is divided into one or more transform units (TUs) 108. TUs 108 can vary in size and may be as small as 4×4 pixels or as large as 32×32 pixels.

The block structure described in FIG. 1 offers coding flexibility of using different PU sizes and TU sizes based on characteristics of incoming content, including the ability to use large block size tools (e.g., large PU size up to 64×64 pixels, large TU size up to 32×32, etc.), which provides significant coding gain compared to the 16×16 block based MPEG AVC/ITU-T H.264 coding.

Figure 2:
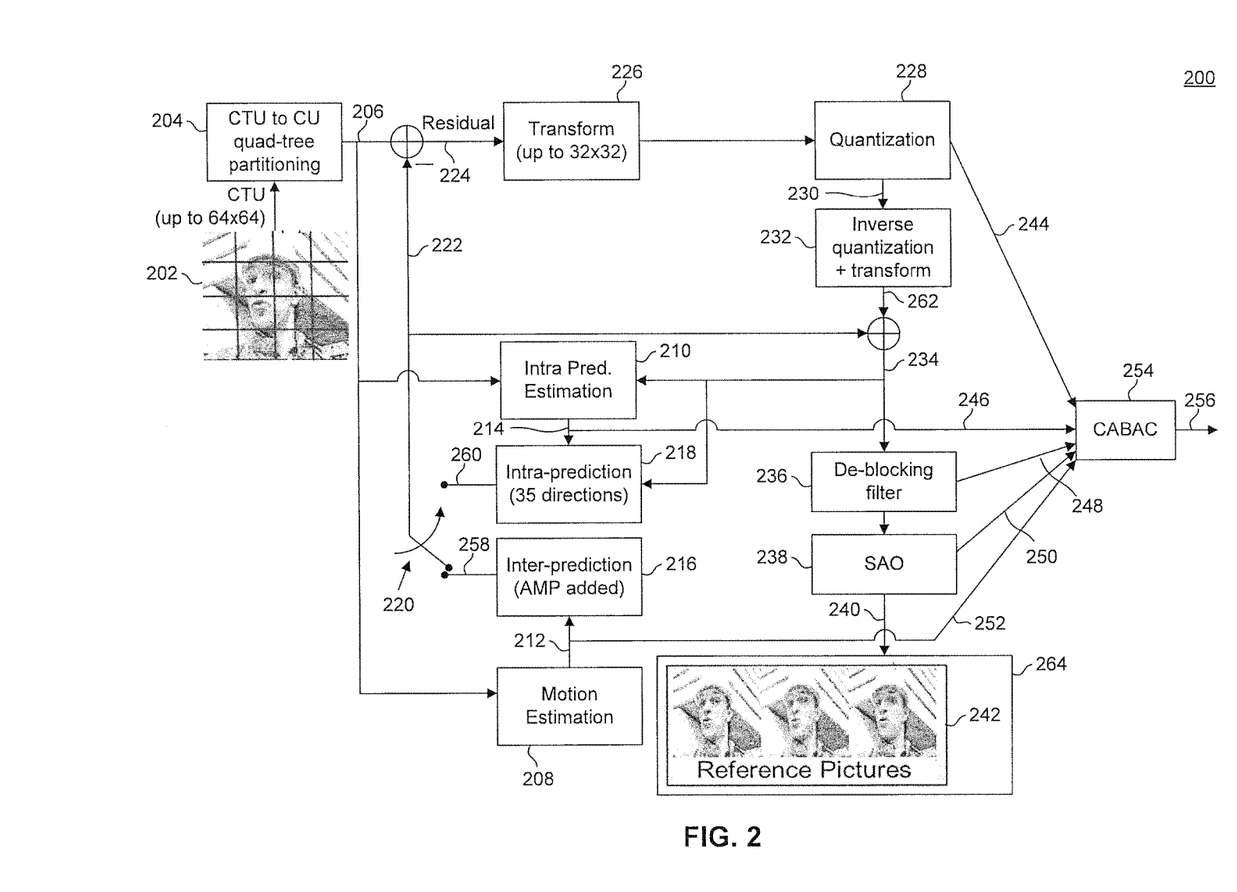
FIG. 2 illustrates an example HEVC encoder.

FIG. 2 illustrates an example HEVC encoder 200. Example HEVC encoder 200 is provided for the purpose of illustration only and is not limiting of embodiments. Example HEVC encoder 200 can be implemented using one or more processors that execute instructions (e.g., computer instructions) stored in memory to implement the functions and features described herein.

As shown in FIG. 2, HEVC encoder 200 receives a CTU 202 via a CTU to CU quad-tree portioning block 204. Block 204 partitions CTU 202 into a plurality of CUs and outputs the plurality of CUs sequentially for further processing. For example, a CU 206 resulting from the partitioning of CTU 202 is provided to a motion estimation block 208 and an intra-prediction estimation block 210.

Motion estimation block 208 generates motion data 212 based on CU 206. In an embodiment, motion estimation block 208 uses stored reference pictures 242 to generate motion data 212. Specifically, motion estimation block 208 uses reference pictures 242 to determine a motion vector for CU 206. The motion vector describes inter-picture motion associated with CU 206. Motion estimation block 208 provides motion data 212 to an inter-prediction block 216.

Intra-prediction estimation block 210 determines one or more intra-prediction modes 214 based on CU 206 and reconstructed neighboring PUs or CUs 234. The one or more intra-prediction modes 214 define one or more extrapolating directions for use to predict CU 206 based on intra-picture samples. For example, a mode 0 may define a downward vertical direction, whereby CU 206 can be predicted by extrapolating samples that lie above CU 206. Intra-prediction estimation block 210 provides the one or more intra-prediction modes 214 to an intra-prediction block 218.

Inter-prediction block 216 generates an inter-picture prediction block 258 for CU 206 based on motion data 212 and reference pictures 242. Intra-prediction block 218 generates an intra-picture prediction block 260 for CU 206 based on the one or more intra-prediction modes 214 and reconstructed CU 234. A selector 220 selects between inter-prediction block 258 and intra-prediction block 260 to generate a prediction block 222. Selector 220 is controlled by control logic (not shown) which determines whether intra- or inter-coding is used for CU 206.

Prediction block 222 is then subtracted from CU 206 to generate a prediction residual block 224. Prediction residual block 224 is processed by a transform block 226 and then quantized by a quantization block 228 to generate quantized transform coefficients block 230. Quantization block 228 also produces quantized transform coefficients symbols for entropy coding 244 during processing.

Quantized transform coefficients block 230 is then provided to inverse quantization and transform block 232. Output 262 of block 232 is summed with prediction block 222 to generate reconstructed CU 234. In an embodiment, reconstructed CU 234 is identical to CU 206 when transform block 226, quantization block 228, and inverse quantization and transform block 232 are bypassed. Reconstructed CU 234 is then filtered by a de-blocking filter 236 and a Sample Adaptive Offset (SAO) filter 238 to generate CU 240. CU 240 is stored in a buffer memory 264 to form reference pictures 242.

Context Adaptive Binary Arithmetic Coding (CABAC) block 254 encodes CU 206 to generate a bitstream 256. In an embodiment, CABAC encoding is performed at the CTU level, where information for CU 206 is encoded along with that of other CUs of CTU 202. In an embodiment, CABAC block 254 receives quantization transform coefficients symbols 244 from quantization block 228, intra-prediction information 246 regarding the one or more intra-prediction modes 214, de-blocking filter parameters 248 from de-blocking filter 236, SAO filter parameters 250 from SAO filter 238, and motion information 252 regarding motion data 212. CABAC block 254 encodes quantized transform coefficients symbols 244 along with the side information (intra-prediction information 246, filter parameters 248, filter parameters 250, and motion information 252) to generate bitstream 256. Bitstream 256 may then be stored and/or transmitted as compressed video.

In response to ever growing bandwidth demand, efforts for more efficient compression standards continue, even after finalization of the latest MPEG HEVC/ITU-T H.265 video compression standard. The ITU-T VCEG (Video Coding Expert Group), for example, has defined an exploration software named KTA (Key Technology Area) to provide a common platform for exploring advanced video coding tools. The KTA software includes new coding tools, including a CTU size up to 256×256 pixels, a 64×64 transform, enhanced multiple transform (EMT), advanced temporal motion vector prediction (ATMVP), luma-based chroma prediction (LMC), Adaptive Loop Filtering (ALF), and Overlapped Block Motion Compensation (OBMC).

OBMC has been proposed for early generations of video standards such as ITU-T H.263+. The OBMC variant implemented in the KTA software provides about 2% coding efficiency gain, which makes it a promising candidate tool for next generation video compression standards.

Figure 3:
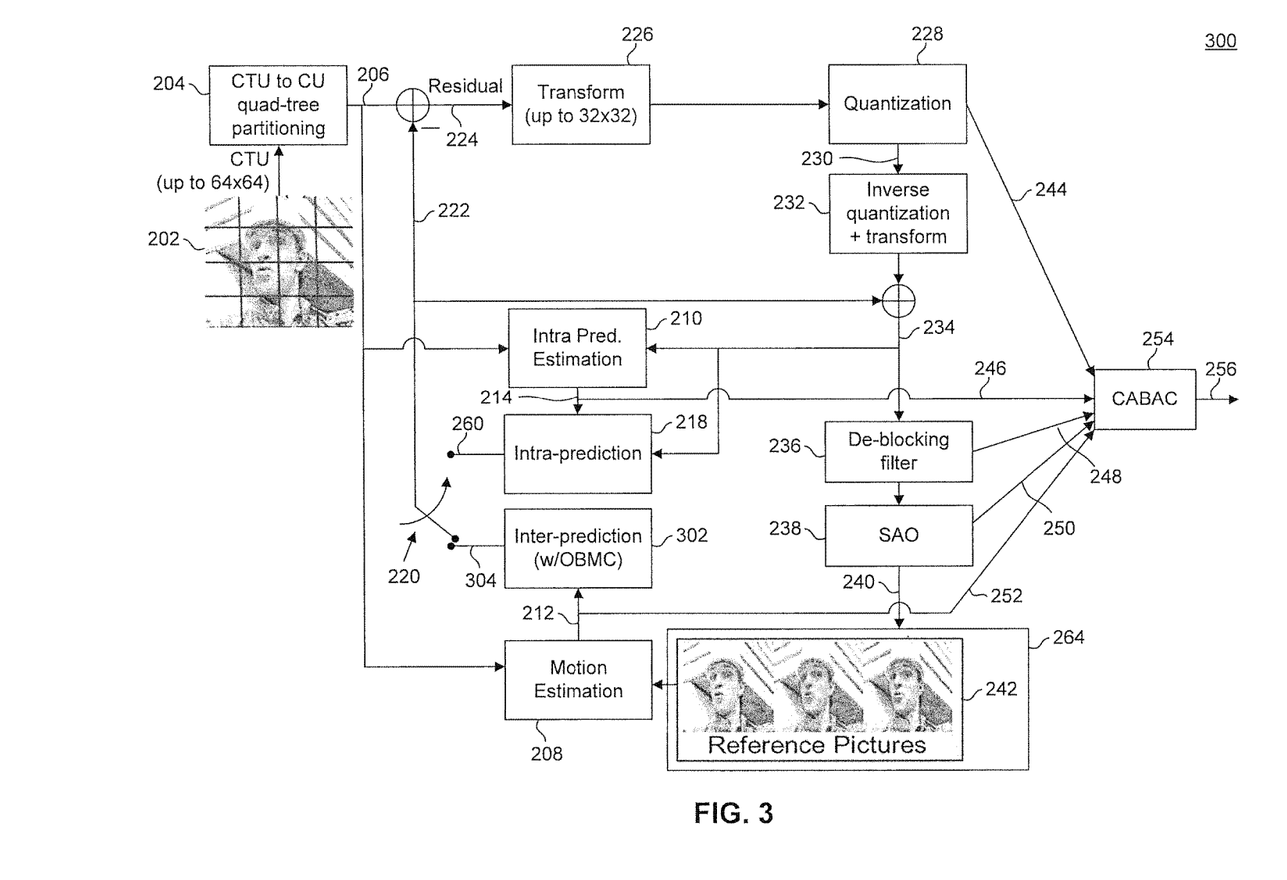
FIG. 3 illustrates an example HEVC encoder with Overlapped Block Motion Compensation (OBMC).

FIG. 3 illustrates an example HEVC encoder 300 with OBMC. Example HEVC encoder 300 is provided for the purpose of illustration only and is not limiting of embodiments. Example HEVC encoder 300 can be implemented using one or more processors that execute instructions stored in memory. As shown in FIG. 3, HEVC encoder 300 is similar architecturally and functionally to HEVC encoder 200 described above, with the difference of including an inter-prediction with OBMC block 302. Inter-prediction block with OBMC block 302 receives motion data 212 and reference pictures 242, and generates a motion-compensated (MC) prediction block 304 for a CU 206 being processed by HEVC encoder 300.

Figure 4:
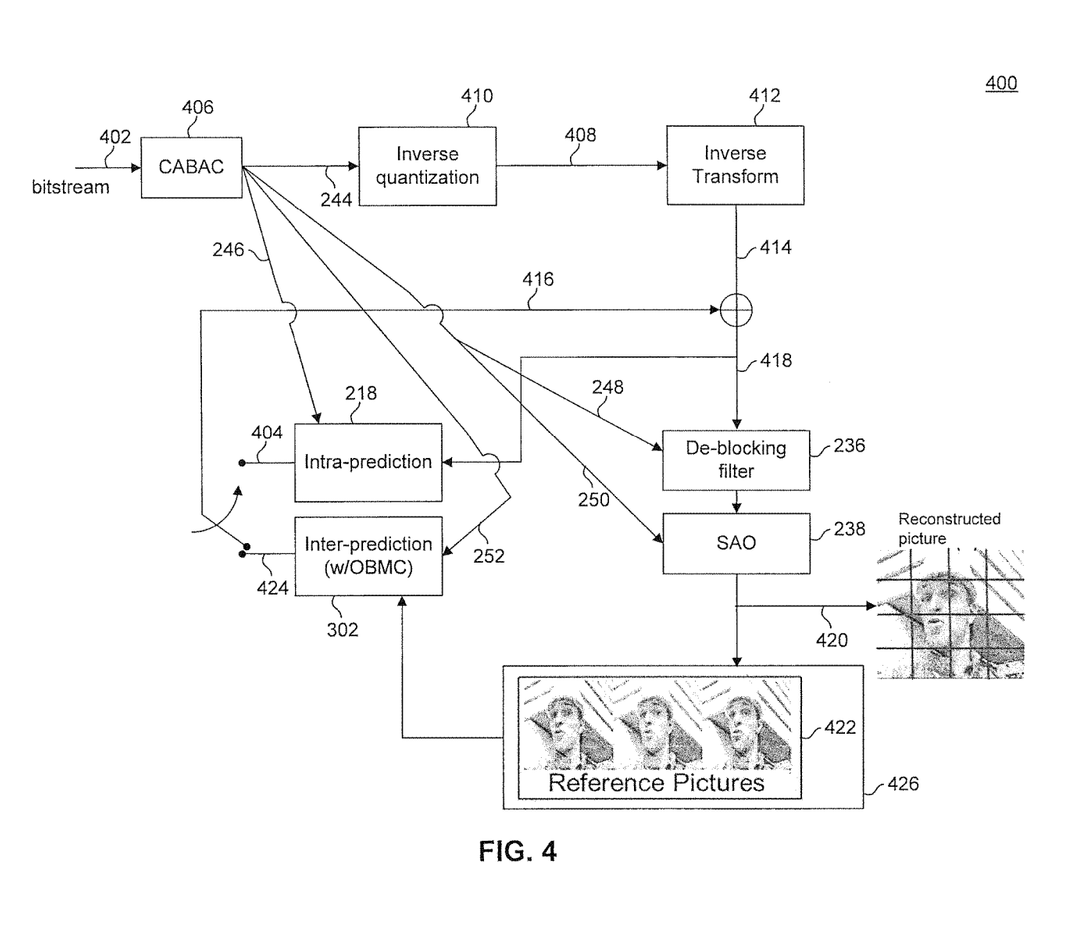
FIG. 4 illustrates an example HEVC decoder with OBMC.

FIG. 4 illustrates an example HEVC decoder 400 with OBMC. Example HEVC decoder 400 is provided for the purpose of illustration only and is not limiting of embodiments. Example HEVC decoder 400 can be implemented using one or more processors that execute instructions stored in memory.

As shown in FIG. 4, a CABAC block 406 of HEVC decoder 400 receives a bitstream 402. Bitstream 402 may correspond to a compressed bitstream such as bitstream 256 generated by HEVC encoder 300. Bitstream 402 is entropy decoded by CABAC block 406 to extract quantized transform coefficients 244, intra-prediction information 246, de-blocking filter parameters 248, SAO filter parameters 250, and motion information 252.

In an embodiment, the extracted information is processed per CU. Specifically, quantized transform coefficients 244 for a CU are provided to an inverse quantization block 410. Output 408 of inverse quantization block 410 is then processed by an inverse transform block 412 to generate a residual block 414.

Intra-prediction block 218 receives intra-prediction information 246 indicating one or more intra-prediction modes for the CU and a reconstructed CU 418 based on the CU, and generates an intra-picture prediction block 404 for the CU. Inter-prediction with OBMC block 302 receives motion information 252 for the CU and reference pictures 422 from a picture buffer memory 426, and generates a MC prediction block 424 for the CU.

Depending on whether the CU is intra or inter-coded (as signaled in the bitstream), intra-prediction block 404 or MC prediction (inter-) block 424 is selected as prediction block 416 and added to residual block 414 to generate reconstructed CU 418. CU 418 is filtered by de-blocking filter 236 using de-blocking filter parameters 248 and then by SAO filter 238 using SAO filter parameters 250 to generate a final reconstructed CU 420. CU 420 is combined with other reconstructed CUs of the same picture to generate a reconstructed picture.

Figure 5:
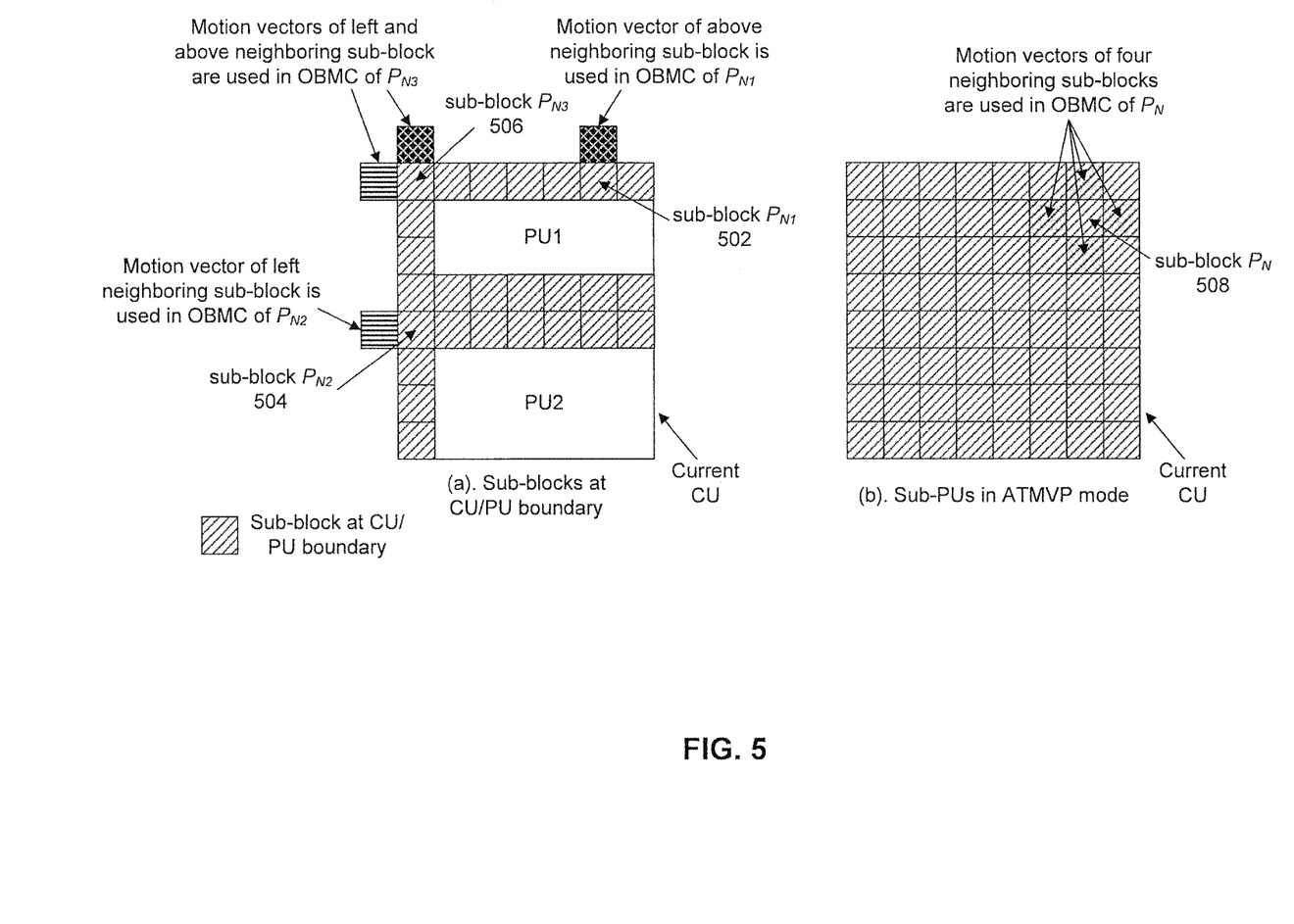
FIG. 5 illustrates example OBMC application methods.

FIG. 5 illustrates example methods for applying OBMC to a CU.

In a first method, an MC block corresponds to a PU, and OBMC is performed, for both luma and chroma components, for all MC block boundaries, except where the MC block boundaries correspond to the right and bottom boundaries of a CU. This first method is illustrated by example (a) of FIG. 5. As shown, in this example, the CU includes two PUs, PU1 and PU2. OBMC is applied at the boundaries of PU1 and PU2, except for those boundaries that correspond to the right and bottom boundaries of the CU. In another embodiment, OBMC may be applied for all MC block boundaries, including where the MC block boundaries correspond to the right and bottom boundaries of the CU.

In an embodiment, to process MC block boundaries in a uniform fashion, OBMC is performed at a sub-block level. In an embodiment, the sub-block size is equal to 4×4 for the luma component. The chroma sub-block size depends on the chroma format used. In example (a) of FIG. 5, OBMC is applied at the sub-blocks that form the top and left boundaries of each of PU1 and PU2.

In a second method, where the ATMVP (Advanced Temporal Motion Vector Predictor) mode is used, the MC block corresponds to a sub-block of a PU. The second method is illustrated by example (b) of FIG. 5. As shown, OBMC in this method is applied at each sub-block of a CU. The sub-block may be 8×8 or 4×4, for example.

In an embodiment, when OBMC is applied to a sub-block, motion vectors of up to four neighboring connected sub-blocks (sub-blocks that share an edge with the current sub-block) may be used along with a motion vector of the sub-block itself to generate a prediction block for the sub-block. In an embodiment, a motion vector of a neighboring sub-block is used when the motion vector is not identical to a motion vector of the sub-block.

Figure 6:
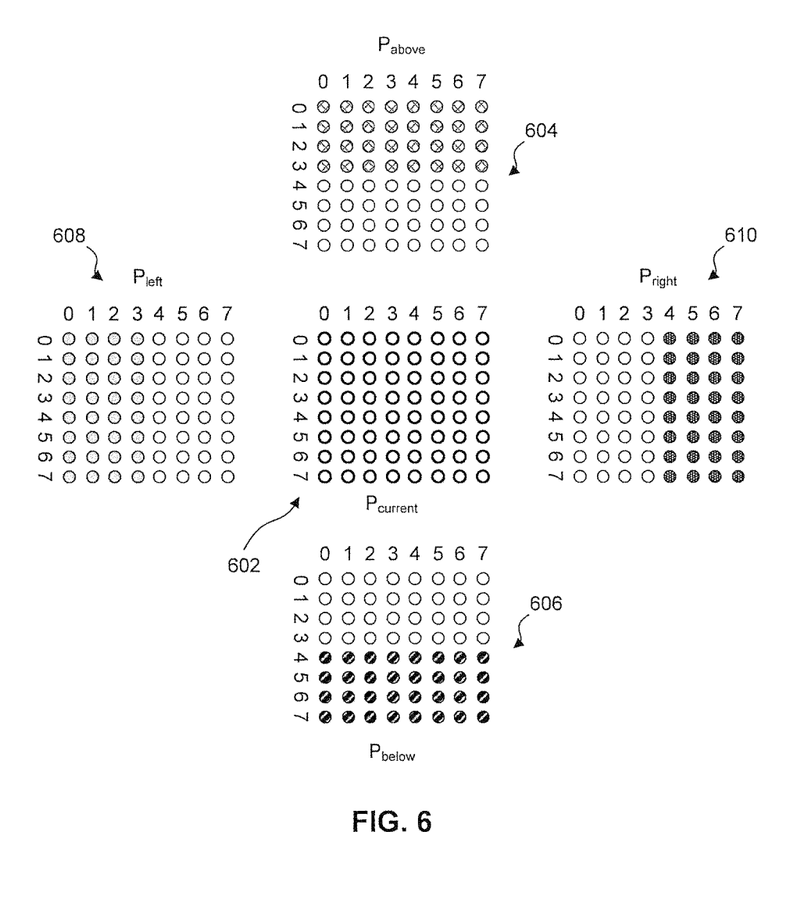
FIG. 6 illustrates example prediction blocks used in OBMC.

In an embodiment, a current prediction block generated based on the motion vector of the sub-block and up to four adjacent prediction blocks generated based on respective motion vectors of the four neighboring sub-blocks may be generated. FIG. 6 illustrates example prediction blocks for an 8×8 luma MC block. As shown, each prediction block includes a group of samples (e.g., 8×8), with each sample corresponding to a pixel. The value of a sample represents the color content (e.g., luma/chroma or RGB components) of the corresponding pixel. Prediction block 602 is the current prediction block for the MC block generated by using the motion vector of the MC block itself. Prediction blocks 604, 606, 608, and 610 are adjacent prediction blocks for the MC block generated by using respective motion vectors of an above, below, left, and right neighboring MC blocks and performing motion compensation at the current MC location. The current prediction block and the adjacent prediction blocks are weighted and blended to generate a final prediction block for the sub-block.

In an embodiment, a PU only has one set of motion information shared by all the sub-blocks of the PU. In an embodiment, an adjacent prediction block is taken into account only when it corresponds to a sub-block of a different PU than the sub-block being processed. Otherwise, if the adjacent sub-block belongs to the same PU as the sub-block (and thus contains the same motion information), then the adjacent sub-block is omitted during OBMC. For example, as shown in FIG. 5, OBMC at sub-block 502 of PU1 uses, in addition to the motion vector of sub-block 502, only the motion vector of an above neighboring sub-block, since all other neighboring sub-blocks of sub-block 502 also belong to PU1. Similarly. OBMC at sub-block 506 of PU2 uses, in addition to the motion vector of sub-block 506, only the motion vectors of a left and an above neighboring sub-blocks, since the right and below neighboring sub-blocks also belong to PU2. In another embodiment, an adjacent prediction block is taken into account only when it corresponds to a sub-block of a different PU and has different motion information than the sub-block being processed. For example, in FIG. 5, assuming the above neighboring sub-block of sub-block 504 has the same motion information as sub-block 504, OBMC for sub-block 504 will take into account only the motion vector of a left neighboring sub-block of sub-block 504, even though the above neighboring sub-block belongs to a different PU.

In another embodiment, all four adjacent prediction blocks are used. For example, with ATMVP mode, OBMC at sub-block 508 uses the motion vectors of all four neighboring sub-blocks to generate a prediction block for sub-block 508.

In an embodiment, a current prediction block is blended with an adjacent prediction block by adding rows/columns of the current prediction block to corresponding rows/columns of the adjacent prediction block, after applying respective weighting factors to each row/column. In an embodiment, row/column addition is done on a pixel per pixel basis.

In an embodiment, where the sub-block size is 4×4, the four rows/columns of the current prediction block are added to the corresponding four rows/columns of the adjacent prediction block. In another embodiment, for small MC blocks (e.g., when the PU size is 8×4 or 4×8 or when the PU is coded with ATMVP mode), only two rows/columns of the current prediction block are added to corresponding two rows/columns of the adjacent prediction block. Weighting factors of ¼ and ⅛ may be used for the two rows/columns of the current prediction block and weighting factors of ¾ and ⅞ may be used for the corresponding two rows/columns of the adjacent prediction block. The same weighting factor is applied to pixels belonging to the same row/column of the current prediction block or the adjacent prediction block.

Figure 7:
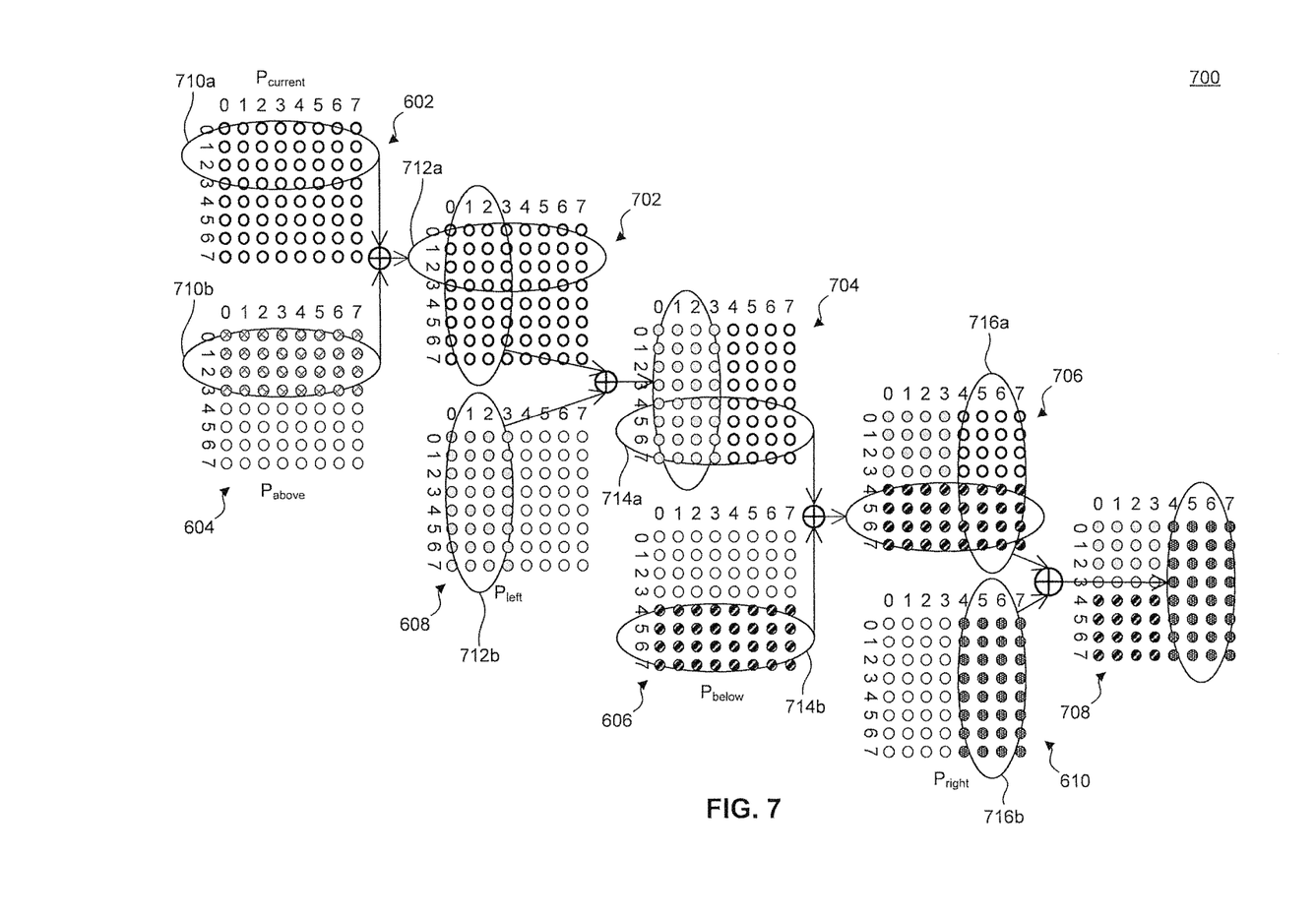
FIG. 7 illustrates an example prediction block blending process.

FIG. 7 illustrates an example prediction block blending process 700. Example process 700 is provided for the purpose of illustration only and is not limiting of embodiments. Example process 700 may be performed by an inter-prediction block with OBMC. For the purpose of illustration only, process 700 is described herein with reference to current prediction block 602 ($P_{current}$), above prediction block 604 ($P_{above}$), below prediction block 606 ($P_{below}$), left prediction block 608 ($P_{left}$), and right prediction block 610 ($P_{right}$), described above with reference to FIG. 6.

As shown in FIG. 7, process 700 begins by combining a top subset of rows 710a of current prediction block 602 with a corresponding top subset of rows 710b of above prediction block 604 to generate a first intermediate prediction block 702. Subsequently, a left subset of columns 712a of first intermediate prediction block 702 are combined with a corresponding left subset of columns 712b of left prediction block 608 to generate a second intermediate prediction block 704.

Next, process 700 includes combining a bottom subset of rows 714a of second intermediate block 704 with a corresponding bottom subset of rows 714b of below prediction blow 606 to generate a third intermediate prediction block 706. Finally, a right subset of columns 716a of third intermediate prediction block 706 are combined with a corresponding right subset of columns 716b of right prediction block 610 to generate a final prediction block 708 for the MC block.

In an embodiment, the subset of rows/columns being combined are weighted with respective weighting factors prior to being added to each other. For example, in combining top subset of rows 710a with top subset of rows 710b, weighting factors of ¾, ⅞, 15/16, and 31/32 may be applied respectively to rows 0, 1, 2, and 3 of top subset 710a, and weighting factors of ¼, ⅛, 1/16, and 1/32 may be applied respectively to rows 0, 1, 2, and 3 of top subset 710b. Row 0 of top subset 710a is then added to row 0 of top subset 710b (in an embodiment, the addition is done pixel by pixel, by adding for each pixel its corresponding two weighted pixel samples from row 0 of top subset 710 and row 0 of top subset 710b), row 1 of top subset 710a is added to row 1 of top subset 710b, and so on. Bottom subset of rows 714a can be combined with bottom subset of rows 714b in a similar fashion, with weighting factors of ¾, ⅞, 15/16, and 31/32 applied respectively to rows 7, 6, 5, and 4 of bottom subset 714a, and weighting factors of ¼, ⅛, 1/16, and 1/32 applied respectively to rows 7, 6, 5, and 4 of bottom subset 714b.

Similarly, for example, in combining left subset of columns 712a with left subset of columns 712b, columns 0, 1, 2, and 3 of left subset 712a may be weighted with weighting factors ¾, ⅞, 15/16, and 31/32, and columns 0, 1, 2, and 3 of left subset 712b may be weighted with weighting factors ¼, ⅛, 1/16, and 1/32. Column 0 of left subset 712a is then added to column 0 of left subset 712b, column 1 of left subset 712a is added to column 1 of left subset 712b, and so on. Right subset of columns 716a can be combined with right subset of columns 716b in a similar fashion, with weighting factors of ¾, ⅞, 15/16, and 31/32 applied respectively to columns 7, 6, 5, and 4 of right subset 716a, and weighting factors of ¼, ⅛, 1/16, and 1/32 applied respectively to columns 7, 6, 5, and 4 of right subset 716b.

As would be understood by a person of skill in the art based on the teachings herein, process 700 is not limited to blending prediction blocks of size 8×8 and other prediction block sizes may be used. Further, pixel blending may be performed over subsets having more or less than four rows/columns in blending any two prediction blocks.

As described above, process 700 is a recursive prediction block blending process in which adjacent prediction blocks are blended with the current prediction block in order (e.g., above, left, below, and right).

Generally, OBMC is a significantly more complex and resource extensive process than regular motion compensation. For example, OBMC requires three times the amount of prediction samples than regular motion compensation (in the case where subsets of four rows/columns are used in the blending process). With process 700, an additional four blending steps are required to blend up to 5 predictions blocks. For Ultra High Definition (UHD) video applications where high throughput is needed for real-time implementations, it is desirable to simplify the blending process, for example by reducing the inter-dependency between processing steps of the blending process.

Figure 8:
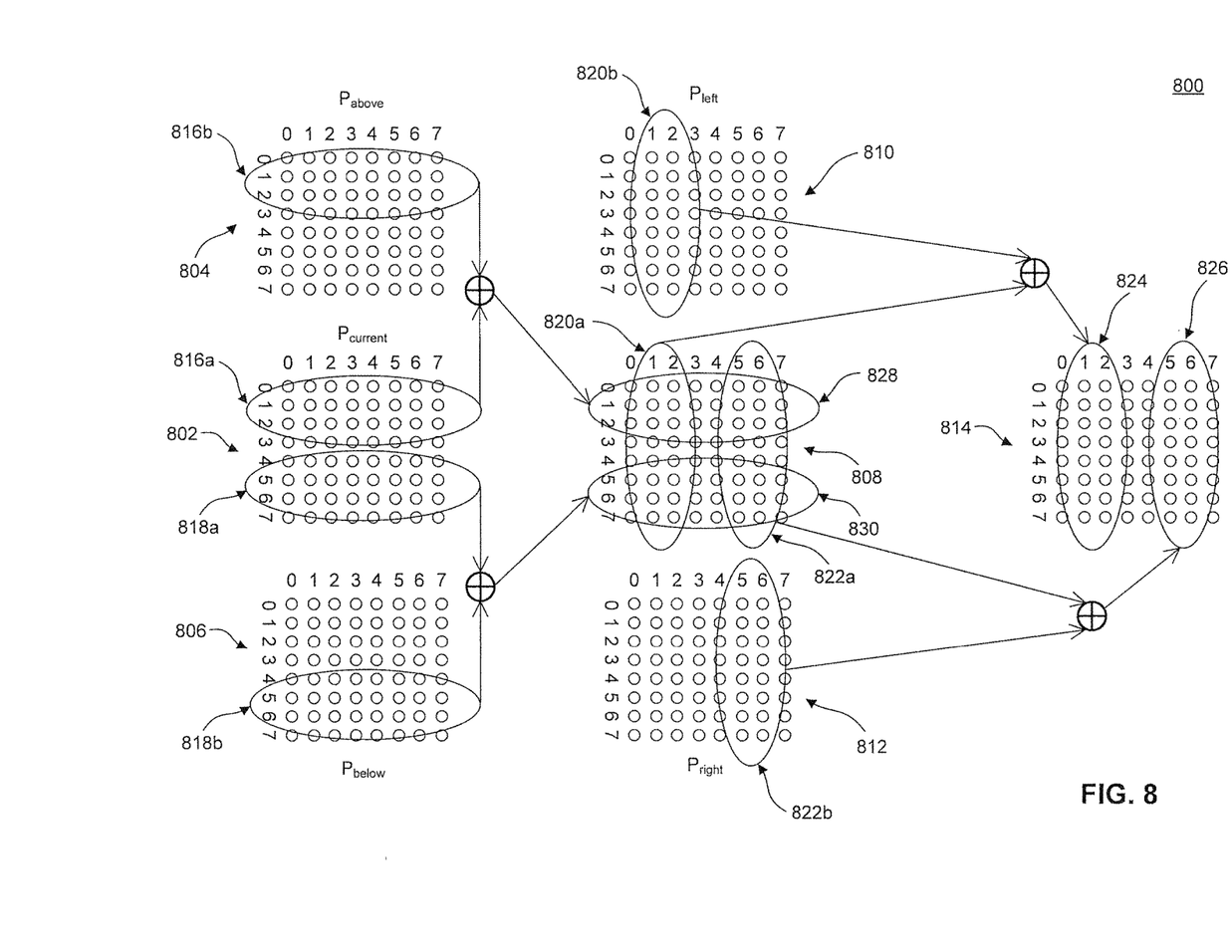
FIG. 8 illustrates another example prediction block blending process.

FIG. 8 illustrates another example prediction block blending process 800. Example process 800 is provided for the purpose of illustration only and is not limiting of embodiments. Example process 800 may be performed by an inter-prediction logic block with OBMC. The inter-prediction logic block may be a part of a video encoder or a video decoder, such as video encoder 300 or video decoder 400, described above. As further described below, process 800 results in a simplified prediction block blending process, more suited for UHD applications.

Process 800 may be used to blend a current prediction block 802 ($P_{current}$) with an above prediction block 804 ($P_{above}$), a below prediction block 806 ($P_{below}$), a left prediction block 810 ($P_{left}$), and a right prediction block 812 ($P_{right}$). As discussed above, current prediction block 802 is a prediction block of a current MC block (a MC block that is currently being processed) generated based on a motion vector associated with the MC block itself. Above prediction block 804, below prediction block 806, left prediction block 810, and right prediction block 812 are prediction blocks for the current MC block based on motion vectors associated respectively with an above, below, left, and right neighboring blocks of the current MC block.

For the purpose of illustration only, it is assumed that the block size is 8×8 and that OBMC is performed over a subset of four rows or columns. As would be understood by a person of skill in the art based on the teachings herein, embodiments are not limited to these numerical examples, and process 800 can be readily extended to blocks/subsets of different sizes.

As shown in FIG. 8, process 800 begins by combining a top subset of rows 816a of current prediction block 802 with a corresponding top subset of rows 816b of above prediction block 804 to generate a first portion 828 of an intermediate prediction block 808; and by combining a bottom subset of rows 818a of current prediction block 802 with a corresponding bottom subset of rows 818b of below prediction block 806 to generate a second portion 830 of intermediate prediction block 808. In an embodiment, the steps of combining top subset 816a with top subset 816b and combining bottom subset 818a with bottom subset 818b are performed in parallel (e.g., simultaneously), as long as top subset 816a and bottom subset 818a do not overlap.

In an embodiment, combining the top subset of rows 816a with the top subset of rows 816b includes weighting the rows of each subset and adding the weighted rows together. For example, weighting factors of ¾, ⅞, 15/16, and 31/32 may be applied respectively to rows 0, 1, 2, and 3 of top subset 816a, and weighting factors of ¼, ⅛, 1/16, and 1/32 may be applied respectively to rows 0, 1, 2, and 3 of top subset 816b. Row 0 of top subset 816a is then added to row 0 of top subset 816b, row 1 of top subset 816a is added to row 1 of top subset 816b, and so on. The bottom subset of rows 818a can be combined with the bottom subset of rows 818b in a similar fashion, by weighting the rows of each subset and adding the weighted rows together.

Subsequently, intermediate prediction block 808 is blended with left prediction block 810 and right prediction block 812 to generate a blended prediction block 814. Specifically, in an embodiment, a left subset of columns 820a of intermediate prediction block 808 is combined with a corresponding left subset of columns 820b of left prediction block 810 to generate a first portion 824 of blended prediction block 814; and a right subset of columns 822a of intermediate prediction block 808 is combined with a corresponding right subset of columns 822b of right prediction block 812 to generate a second portion 826 of blended prediction block 814. In an embodiment, the steps of combining left subset 820a with left subset 820b and combining right subset 822a with right subset 822b are performed in parallel (e.g., simultaneously), as long as left subset 820a and right subset 822a do not overlap.

In an embodiment, combining the left subset of columns 820a with the left subset of columns 820b includes weighting the columns of each subset and adding the weighted columns together. For example, weighting factors of ¾, ⅞, 15/16, and 31/32 may be applied respectively to columns 0, 1, 2, and 3 of left subset 820a, and weighting factors of ¼, ⅛, 1/16, and 1/32 may be applied respectively to columns 0, 1, 2, and 3 of left subset 820b. Column 0 of left subset 820a is then added to column 0 of left subset 820b, column 1 of left subset 820a is added to column 1 of left subset 820b, and so on. The right subset of columns 822a can be combined with the right subset of columns 822b in a similar fashion, by weighting the columns of each subset and adding the weighted columns together.

As described above, process 800 may require up to only two steps to blend up to 5 prediction blocks together. This significantly simplifies the blending process compared to process 700, for example, allowing for an increased data throughput and simplified memory access. In an embodiment, process 800 has comparable coding efficiency performance than existing KTA OBMC.

In an embodiment, prior to being combined, intermediate prediction block 808, left prediction block 810, and right prediction block 812 are transposed. The transposed prediction blocks are then processed in an identical fashion to current prediction block 802, above prediction block 804, and below prediction block 806. The resulting blended prediction block is then transposed to generate blended prediction block 814. This embodiment allows the same circuitry or code to be used for both blending steps of process 800.

As would be understood by a person of skill in the art based on the teachings, in other embodiments, the steps of process 800 may be reversed, such that current prediction block 802 is first blended with left prediction block 810 and right prediction block 812. The resulting intermediate prediction block is then blended with above prediction block 804 and below prediction block 806 to generate the blended prediction block for the MC block.

In addition to throughput improvement, process 800 enables flexible architectures for implementation. By performing prediction block blending using above prediction block 804 and below prediction block 806 prior to using left prediction block 810 and right prediction block 812, the OBMC process for the horizontal MC block boundaries is independent of that of the vertical MC block boundaries. In an embodiment, OBMC can be performed for all the horizontal MC block boundaries of a block (e.g., of size 16×16) first. The resulting block can then be transposed, and the same logic re-used to perform OBMC for all the vertical MC block boundaries of the block. In addition, the supported block size is flexible. For example, the block can be of any size larger than the smallest PU size, such as 16×16, 32×32, a CTU, or even a picture. In contrast, in the current KTA OBMC, because a specified blending order has to be followed, different logic for OBMC along the vertical and horizontal MC block boundaries is needed, or otherwise frequent data rearrangements are needed in order to re-use the same OBMC weighting logic.

In a variation of example process 800, current prediction block 802 is blended with above prediction block 804 and below prediction block 806 in parallel with it being blended with left prediction block 810 and right prediction block 812. The blending of current prediction block 802 with above prediction block 804 and below prediction block 806 and the blending of current prediction block 802 with left prediction block 810 and right prediction block 812 are as described above with respect to process 800. In an embodiment, to perform the two parallel blending steps, current prediction block 802 is replicated. Each of the two parallel blending steps results in a respective intermediate prediction block. The two intermediate prediction blocks are then blended together to obtain the final OBMC prediction block.

Figure 9:
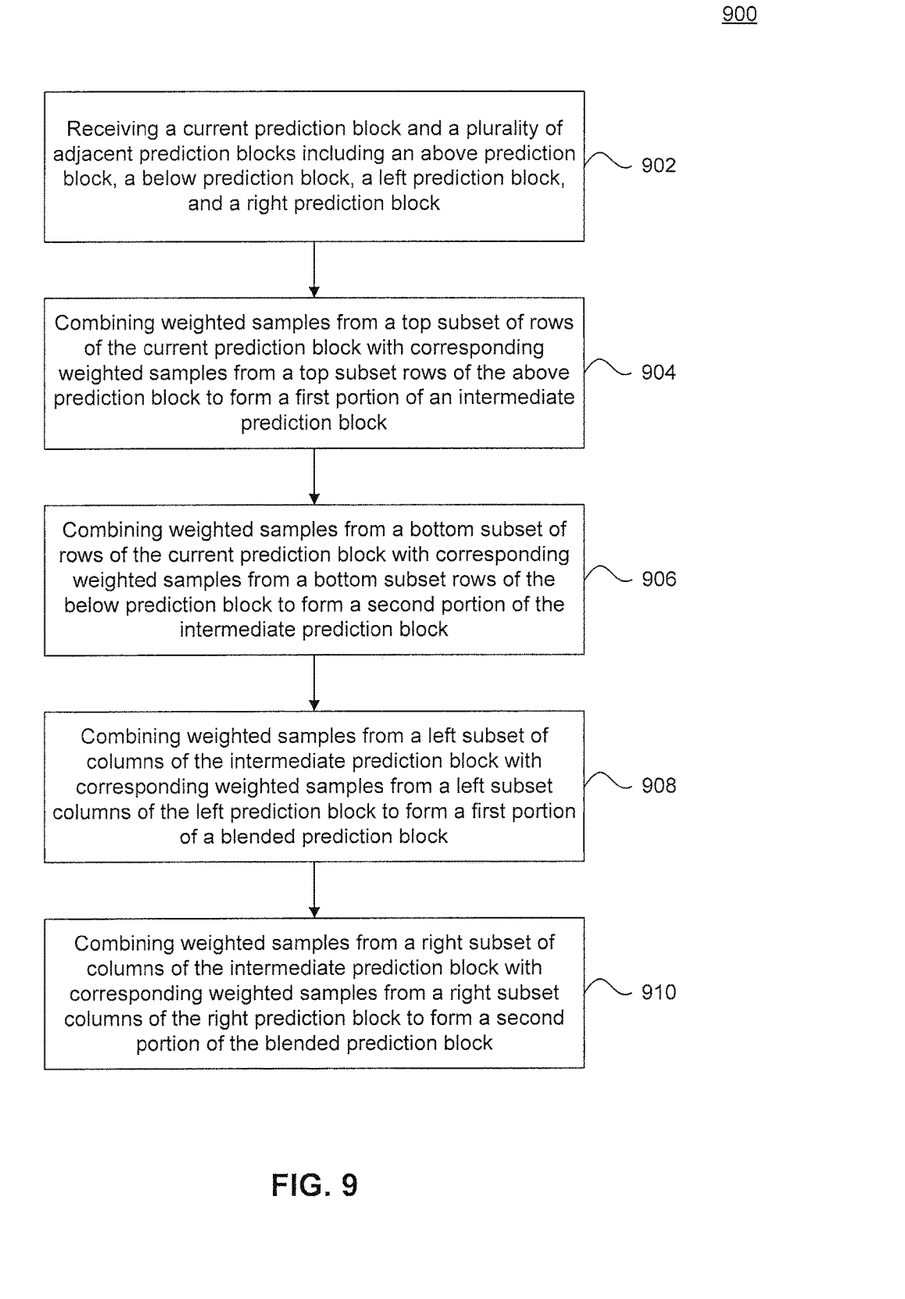
FIG. 9 illustrates an example prediction block blending process.

FIG. 9 illustrates an example process 900 according to an embodiment. Example process 900 is provided for the purpose of illustration only and is not limiting of embodiments. Example process 900 may be performed by a video processing apparatus, such a HEVC encoder 300 or HEVC decoder 400, and more specifically by an inter-prediction with OBMC block, such as block 302, for example.

As shown in FIG. 9, process 900 begins in step 902, which includes receiving a current prediction block and a plurality of adjacent prediction blocks including an above prediction block, a below prediction block, a left prediction block, and a right prediction block. In an embodiment, the current prediction block corresponds to a boundary block of a CU, such as a top or a left boundary block of the CU or a bottom or a right boundary block of the CU. In another embodiment, the current prediction block corresponds to a sub-block of a PU.

Next, step 904 includes combining first weighted samples from a top subset of rows of the current prediction block with corresponding second weighted samples from a top subset of rows of the above prediction block to form a first portion of an intermediate prediction block. In an embodiment, prior to step 904, process 900 further includes applying a first set of weighting factors to samples from the top subset of rows of the current prediction block to generate the first weighted samples; and applying a second set of weighting factor to samples from the top subset of rows of the above prediction block to generate the second weighted samples. In an embodiment, weighting factors of the first set are larger than weighting factors of the second set. For example, the first set of weighting factors may include $3/4$, $7/8$, $15/16$, and $31/32$ and the second set of weighting factors may include $1/4$, $1/8$, $1/16$, and $1/32$.

Next or simultaneously with step 904, step 906 includes combining third weighted samples from a bottom subset of rows of the current prediction block with corresponding fourth weighted samples from a bottom subset of rows of the below prediction block to form a second portion of the intermediate prediction block. In an embodiment, the bottom subset of rows of the current prediction block is non-overlapping with the top subset of rows of the current prediction block. In an embodiment, prior to step 906, process 900 further includes applying a third set of weighting factors to samples from the bottom subset of rows of the current prediction block to generate the third weighted samples; and applying a fourth set of weighting factors to samples from the bottom subset of rows of the below prediction block to generate the fourth weighted samples. In an embodiment, weighting factors of the third set are larger than weighting factors of the fourth set. For example, the third set of weighting factors may include $3/4$, $7/8$, $15/16$, and $31/32$ and the fourth set of weighting factors may include $1/4$, $1/8$, $1/16$, and $1/32$.

Next, step 908 includes combining fifth weighted samples from a left subset of columns of the intermediate prediction block with corresponding sixth weighted samples from a left subset of columns of the left prediction block to form a first portion of a blended prediction block. In an embodiment, prior to step 908, process 900 further includes applying a fifth set of weighting factors to samples from the left subset of columns of the current prediction block to generate the fifth weighted samples: and applying a sixth set of weighting factors to samples from the left subset of columns of the left prediction block to generate the sixth weighted samples. In an embodiment, weighting factors of the fifth set are larger than weighting factors of the sixth set. For example, the fifth set of weighting factors may include $3/4$, $7/8$, $15/16$, and $31/32$ and the sixth set of weighting factors may include $1/4$, $1/8$, $1/16$, and $1/32$.

Next or simultaneously with step 908, step 910 includes combining seventh weighted samples from a right subset of columns of the intermediate prediction block with corresponding eighth weighted samples from a right subset of columns of the right prediction block to form a second portion of the blended prediction block. In an embodiment, the right subset of columns of the intermediate prediction block is non-overlapping with the left subset of columns of the intermediate prediction block. In an embodiment, prior to step 910, process 900 further includes applying a seventh set of weighting factors to samples from the right subset of columns of the current prediction block to generate the seventh weighted samples; and applying an eighth set of weighting factors to samples from the right subset of columns of the right prediction block to generate the eighth weighted samples. In an embodiment, weighting factors of the seventh set are larger than weighting factors of the eighth set. For example, the seventh set of weighting factors may include $3/4$, $7/8$, $15/16$, and $31/32$ and the eighth set of weighting factors may include $1/4$, $1/8$, $1/16$, and $1/32$.

In an embodiment, prior to steps 908 and 910, process 900 includes transposing the intermediate prediction block, the left prediction block, and the right prediction block. Subsequently, step 908 includes combining ninth weighted samples from a top subset of rows of the transposed intermediate prediction block with corresponding tenth weighted samples from a top subset of rows of the transposed left prediction block to generate a first portion of a transposed blended prediction block; and step 910 includes combining eleventh weighted samples from a bottom subset of rows of the transposed intermediate prediction block with corresponding twelfth weighted samples from a bottom subset of rows of the transposed right prediction block to generate a second portion of the transposed blended prediction block. Process 900 then terminates by transposing the transposed blended prediction block to generate the blended prediction block.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
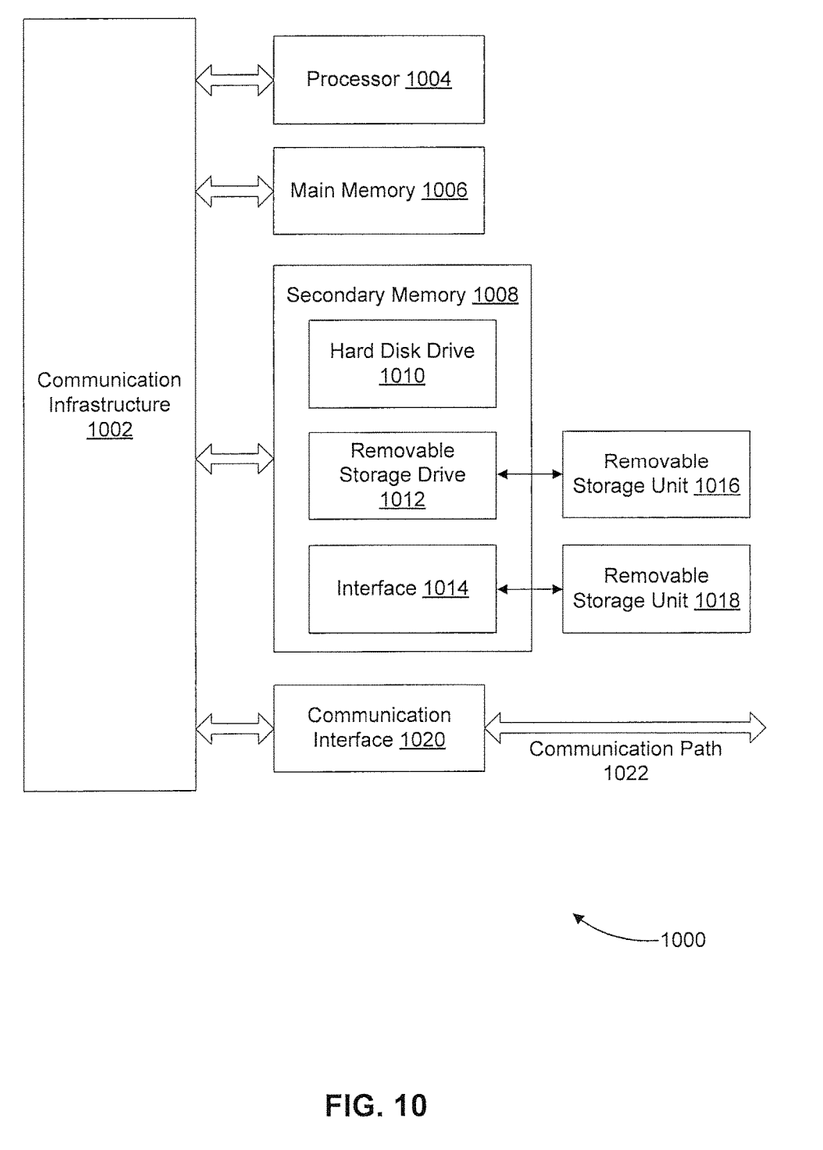
FIG. 10 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1000 is shown in FIG. 10. Blocks depicted in FIGS. 1, 2, 6, and 8 may execute on one or more computer systems 1000. Furthermore, each of the steps of the method depicted in FIGS. 7 and 9 can be implemented on one or more computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and other hardware media. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A method of video processing, comprising:
receiving, by a processor, a current prediction block and a plurality of adjacent prediction blocks including an above prediction block, a below prediction block, a left prediction block, and a right prediction block; and
blending, by the processor, the current prediction block and the plurality of adjacent prediction blocks, including:
combining first weighted samples from a top subset of rows of the current prediction block with corresponding second weighted samples from a top subset of rows of the above prediction block to form a first portion of an intermediate prediction block;
combining third weighted samples from a bottom subset of rows of the current prediction block with corresponding fourth weighted samples from a bottom subset of rows of the below prediction block to form a second portion of the intermediate prediction block;
combining fifth weighted samples from a left subset of columns of the intermediate prediction block with corresponding sixth weighted samples from a left subset of columns of the left prediction block to form a first portion of a blended prediction block; and
combining seventh weighted samples from a right subset of columns of the intermediate prediction block with corresponding eighth weighted samples from a right subset of columns of the right prediction block to form a second portion of the blended prediction block,
wherein the combining the first weighted samples with the second weighted samples is performed simultaneously with the combining the third weighted samples with the fourth weighted samples, and
wherein the combining the fifth weighted samples with the sixth weighted samples is performed simultaneously with the combining the seventh weighted samples with the eighth weighted samples.

2. The method of claim 1, further comprising:
applying a first set of weighting factors to samples from the top subset of rows of the current prediction block to generate the first weighted samples;
applying a second set of weighting factors to samples from the top subset of rows of the above prediction block to generate the second weighted samples;
applying a third set of weighting factors to samples from the bottom subset of rows of the current prediction block to generate the third weighted samples;
applying a fourth set of weighting factors to samples from the bottom subset of rows of the below prediction block to generate the fourth weighted samples;
applying a fifth set of weighting factors to samples from the left subset of columns of the intermediate prediction block to generate the fifth weighted samples;
applying a sixth set of weighting factors to samples from the left subset of columns of the left prediction block to generate the sixth weighted samples;
applying a seventh set of weighting factors to samples from the right subset of columns of the intermediate prediction block to generate the seventh weighted samples;
applying an eighth set of weighting factors to samples from the right subset of columns of the right prediction block to generate the eighth weighted samples.

3. The method of claim 2, wherein the first set of weighting factors, the third set of weighting factors, the fifth set of weighting factors, and the seventh set of weighting factors are greater respectively than the second set of weighting factors, the fourth set of weighting factors, the sixth set of weighting factors, and the eighth set of weighting factors.

4. The method of claim 2, wherein the top subset of rows of the current prediction block and the bottom subset of rows of the current prediction block are non-overlapping, and wherein the left subset of columns of the intermediate prediction block and the right subset of columns of the intermediate prediction block are non-overlapping.

5. The method of claim 1, further comprising:
transposing the intermediate prediction block, the left prediction block, and the right prediction block.

6. The method of claim 5, wherein combining the fifth weighted samples with the sixth weighted samples comprises:
combining ninth weighted samples from a top subset of rows of the transposed intermediate prediction block with corresponding tenth weighted samples from a top subset of rows of the transposed left prediction block to generate a first portion of a transposed blended prediction block.

7. The method of claim 6, wherein combining the seventh weighted samples with the eighth weighted samples comprises:
combining eleventh weighted samples from a bottom subset of rows of the transposed intermediate prediction block with corresponding twelfth weighted samples from a bottom subset of rows of the transposed right prediction block to generate a second portion of the transposed blended prediction block.

8. The method of claim 7, further comprising:
transposing the transposed blended prediction block to generate the blended prediction block.

9. The method of claim 1, wherein the current prediction block corresponds to a boundary block of a coding unit (CU).

10. The method of claim 9, wherein the boundary block corresponds to a top boundary block or a left boundary block of the CU.

11. The method of claim 9, wherein the boundary block corresponds to a bottom boundary block or a right boundary block of the CU.

12. The method of claim 9, wherein the current prediction block corresponds to a sub-block of a prediction unit (PU).

13. The method of claim 1, further comprising:
generating a bitstream including the blended prediction block and transmitting the bitstream.

14. A video processing apparatus, comprising:
a memory that stores instructions; and
a processor, upon executing the instructions, configured to:
receive a current prediction block and a plurality of adjacent prediction blocks including an above prediction block, a below prediction block, a left prediction block, and a right prediction block;
combine first weighted samples from a top subset of rows of the current prediction block with corresponding second weighted samples from a top subset of rows of the above prediction block to form a first portion of an intermediate prediction block;
combine third weighted samples from a bottom subset of rows of the current prediction block with corresponding fourth weighted samples from a bottom subset of rows of the below prediction block to form a second portion of the intermediate prediction block;
combine fifth weighted samples from a left subset of columns of the intermediate prediction block with corresponding sixth weighted samples from a left subset of columns of the left prediction block to form a first portion of a blended prediction block; and
combine seventh weighted samples from a right subset of columns of the intermediate prediction block with corresponding eighth weighted samples from a right subset of columns of the right prediction block to form a second portion of the blended prediction block;
wherein the processor is further configured to:
combine the first weighted samples with the second weighted samples simultaneously with combining the third weighted samples with the fourth weighted samples, and
combine the fifth weighted samples with the sixth weighted samples simultaneously with combining the seventh weighted samples with the eighth weighted samples.

15. The video processing apparatus of claim 14, wherein, upon executing the instructions, the processor is further configured to:
transpose the intermediate prediction block, the left prediction block, and the right prediction block.

16. The video processing apparatus of claim 15, wherein, upon executing the instructions, the processor is further configured to:
combining ninth weighted samples from a top subset of rows of the transposed intermediate prediction block with corresponding tenth weighted samples from a top subset of rows of the transposed left prediction block to generate a first portion of a transposed blended prediction block;
combine eleventh weighted samples from a bottom subset of rows of the transposed intermediate prediction block with corresponding twelfth weighted samples from a bottom subset of rows of the transposed right prediction block to generate a second portion of the transposed blended prediction block; and
transpose the transposed blended prediction block to generate the blended prediction block.

17. The video processing apparatus of claim 14, wherein the processor is further configured to generate a bitstream including the blended prediction block and cause the bitstream to be transmitted.

18. A method of video processing, comprising:
receiving, by a processor, a current prediction block and a plurality of adjacent prediction blocks including an above prediction block, a below prediction block, a left prediction block, and a right prediction block;
combining first weighted samples from a top subset of rows of the current prediction block with corresponding second weighted samples from a top subset of rows of the above prediction block to form a first portion of an intermediate prediction block;
combining third weighted samples from a bottom subset of rows of the current prediction block with corresponding fourth weighted samples from a bottom subset of rows of the below prediction block to form a second portion of the intermediate prediction block;
transposing the intermediate prediction block, the left prediction block, and the right prediction block;
combining fifth weighted samples from a top subset of rows of the transposed intermediate prediction block with corresponding sixth weighted samples from a top subset of rows of the transposed left prediction block to generate a first portion of a transposed blended prediction block; and
combining seventh weighted samples from a bottom subset of rows of the transposed intermediate prediction block with corresponding eighth weighted samples from a bottom subset of rows of the transposed right prediction block to generate a second portion of the transposed blended prediction block,
wherein the combining the first weighted samples with the second weighted samples is performed simultaneously with the combining the third weighted samples with the fourth weighted samples, and
wherein the combining, the fifth weighted samples with the sixth weighted samples is performed simultaneously with the combining the seventh weighted samples with the eighth weighted samples.

19. The method of claim 18, further comprising:
transposing the transposed blended prediction block to generate the blended prediction block.

20. The method of claim 18, further comprising:
generating a bitstream including the blended prediction block and transmitting the bitstream.

* * * * *